(12) United States Patent
Yamaguchi

(10) Patent No.: US 6,335,996 B1
(45) Date of Patent: *Jan. 1, 2002

(54) FIXING STRUCTURE FOR OPTICAL CONNECTOR

(75) Inventor: Toru Yamaguchi, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/455,910

(22) Filed: Dec. 7, 1999

(30) Foreign Application Priority Data

Aug. 5, 1999 (JP) .......................... 11-222162

(51) Int. Cl.$^7$ ................................ G02B 6/00
(52) U.S. Cl. .................. 385/134; 439/573; 257/81
(58) Field of Search ................... 385/134, 135, 385/136, 88, 89, 92, 94; 257/80, 81, 82, 83, 84, 85, 86, 87, 88, 89; 439/79, 607, 586, 587, 274, 275, 564, 573; 411/411, 412, 387, 386, 356, 357, 366, 367

(56) References Cited

U.S. PATENT DOCUMENTS

| 4,428,640 A | * | 1/1984 | Pittman | 339/176 M |
|---|---|---|---|---|
| 4,842,467 A | * | 6/1989 | Armstrong | 411/411 |
| 5,648,889 A | | 7/1997 | Bosli | |
| 5,662,444 A | * | 9/1997 | Schmidt, Jr. | 411/369 |
| 5,697,796 A | * | 12/1997 | Harji et al. | 439/564 |
| 5,738,533 A | * | 4/1998 | Furay | 439/79 |

FOREIGN PATENT DOCUMENTS

| JP | 10-284183 | 10/1998 |
|---|---|---|
| JP | 11-174550 | 7/1999 |
| JP | 11-204969 | 7/1999 |

* cited by examiner

Primary Examiner—Cassandra Spyrou
Assistant Examiner—Euncha Cherry
(74) Attorney, Agent, or Firm—Armstrong, Westerman, Hattori, McLeland & Naughton, LLP

(57) ABSTRACT

A fixing structure for optical connectors consists of a circuit board, a receptacle having a conductive housing shieldingly connected to the circuit board, the housing having an integral fixing portion with a prepared hole formed therein, and a screw passed through the circuit board and screwed in the prepared hole to fix the housing to the circuit board. The fixing portion has a sealing wall closing the prepared hole at a distal end thereof and an enclosed shaving receiver formed in the prepared hole, between the sealing wall and the screw. A short circuit is prevented which is caused by shavings produced when the screw is screwed in the prepared hole.

5 Claims, 5 Drawing Sheets

FIXING STRUCTURE FOR OPTICAL CONNECTOR

BACKGROUND OF THE INVENTION

1. Field of the Invention

This invention relates to a fixing structure for optical connectors which fixes a conductive, shielding receptacle housing to a circuit board by means of a tapping screw.

2. Description of the Related Art

FIG. 4 shows a conventional optical connector.

The optical connector 35 is made up of a male optical plug 21 and a female receptacle 36. The optical plug 21 is inserted into a fitting chamber 37 of the receptacle 36 and locked there through its locking arm 27. The receptacle 36 has a pair of substantially cylindrical fixing portions 38 at its opposite sides and is fixed to a circuit board 39 with a pair of tapping screws (male screws) threaded into the fixing portions 38.

The optical plug 21 has a male housing 26 and, as best shown in FIG. 5, ferrules 41 (only one is shown) inside the housing which connect to optical fibers 33. The ferrule 41 is biased forwardly (in a connector-fitting direction) by a coil spring 42, so that its flange 43 is movable between a stopper 44 and a locking projection 45 inside the housing 26.

The receptacle 36 has a female housing 26' of conductive synthetic resin material and, as best shown in FIG. 6, ferrule-receiving cylinders 44 inside the housing 26'. The fitting chamber 37 of the housing 26' is defined by a vertical partition wall 13, and the receiving chambers 45 project integrally from the partition wall 13.

The receptacle-making synthetic-resin material contains, for example, carbon fibers to exhibit conductivity and shield against noise-making electric interference from outside and inside the housing 26'. The housing 26' makes contact with a ground circuit (not shown) on the circuit board 39 through the fixing portions 38 at the opposite sides at the rear of the housing, a forwardly-located positioning pin 46 (FIG. 6).

The receiving cylinder 45 has at the rear side a large diameter portion 45a with a sleeve 14 inserted therein. The sleeve 14 consists of an inner waveguide (not shown) of glass or synthetic resin and a metal cylindrical holder. An optical element module 12 is located adjacent to the rear of the receiving cylinder 45. The sleeve 14 is in contact with the optical element module 12. The optical element module 12 connects through a lead terminal 19 to the circuit board 39, and a cover 47 presses the module from the rear toward the receiving cylinder 45.

The optical element module 12 includes a light emitting element (e.g. light emitting diode) module and a light receiving element (e.g. photodiode) module which are juxtaposed in correspondence to the two optical fibers 33 on the optical plug 21.

If the optical plug 21 is fitted in the receptacle 36 in FIG. 4, a small diameter portion 41a at the front of the ferrule 41 in FIG. 5 advances into a small-diameter portion 45b at the front of the receiving cylinder 45 in FIG. 6, so that the tip end of the ferrule small diameter portion 41a makes contact with the waveguide of the sleeve 14, and the front end of a ferrule large-diameter portion 41b abuts against the front end of the receiving cylinder 45.

Before the optical plug 21 and the receptacle 36 are fitted together, the housing 26' of the receptacle 36 is preliminarily fixed through the positioning pin 46 (FIG. 6) to the circuit board 39, followed by, as shown in FIGS. 7 and 8, fully fixing same on the circuit board 39 by means of tapping screws 40 (only one is shown). The circuit board 39 is provided with insertion holes 48 (only one is shown) of diameter equal to or larger than that of the tapping screws 40, and each fixing portion 38 is provided with a prepared throughhole 49 of diameter smaller than the tapping screw diameter. The tapping screw 40 is threaded into the throughhole 49, while shaving the inner periphery of the latter.

With the conventional fixing structure for optical connectors, however, when the tapping screw 40 is threaded in as shown in FIG. 8, it shaves the inner periphery of the fixing portion 38 to produce shavings 32 which are of the same conductive resin material as the housing 26' and which, when dropped on the circuit board 39, may cause a short in the wiring (not shown) on the circuit board 39. Further, where the circuit board 39 is used in a vertical position or upside down, the conductive shavings 32 tend to fall and cause an electrically adverse effect on other equipment and electric components located therebelow.

SUMMARY OF THE INVENTION

This invention has been accomplished to overcome the above drawbacks and an object of this invention is to provide a fixing structure for optical connectors in which a conductive housing of a receptacle of an optical connector is tightened to a circuit board with tapping screws (male screws) with resultant production of shavings at the fixing portion of the housing, but yet which is free of a malfunction such as a short caused by the shavings in the wiring on the circuit board.

In order to attain the object, according to this invention, there is provided a fixing structure for optical connectors which comprises: a circuit board; a receptacle having a conductive housing shieldingly connected to the circuit board, the housing having an integral fixing portion with a prepared hole formed therein; and a screw passed through the circuit board and screwed in the prepared hole of the fixing portion to fix the housing to the circuit board, wherein the fixing portion has a sealing wall which closes the prepared hole at a distal end thereof and an enclosed shaving receiver formed in the prepared hole, between the sealing wall and the screw, for retaining shavings produced when the screw is screwed in the prepared hole.

Preferably, the screw comprises a tapping screw, and the prepared hole comprises a hole without a thread.

Preferably, the screw comprises a bolt, and the prepared hole comprises a hole with a female thread.

Preferably, a length of the prepared hole is set greater than a projection length of the screw from the circuit board.

Preferably, the sealing wall of the fixing portion is flush with an outer wall of the housing.

The above and other objects, features and advantages of this invention will become apparent from the following description and the appended claims, taken in conjunction with the accompanying drawings.

DESCRIPTION OF THE PREFERRED EMBODIMENT

An embodiment of this invention will now be described with reference to the attached drawings.

Figure 1:
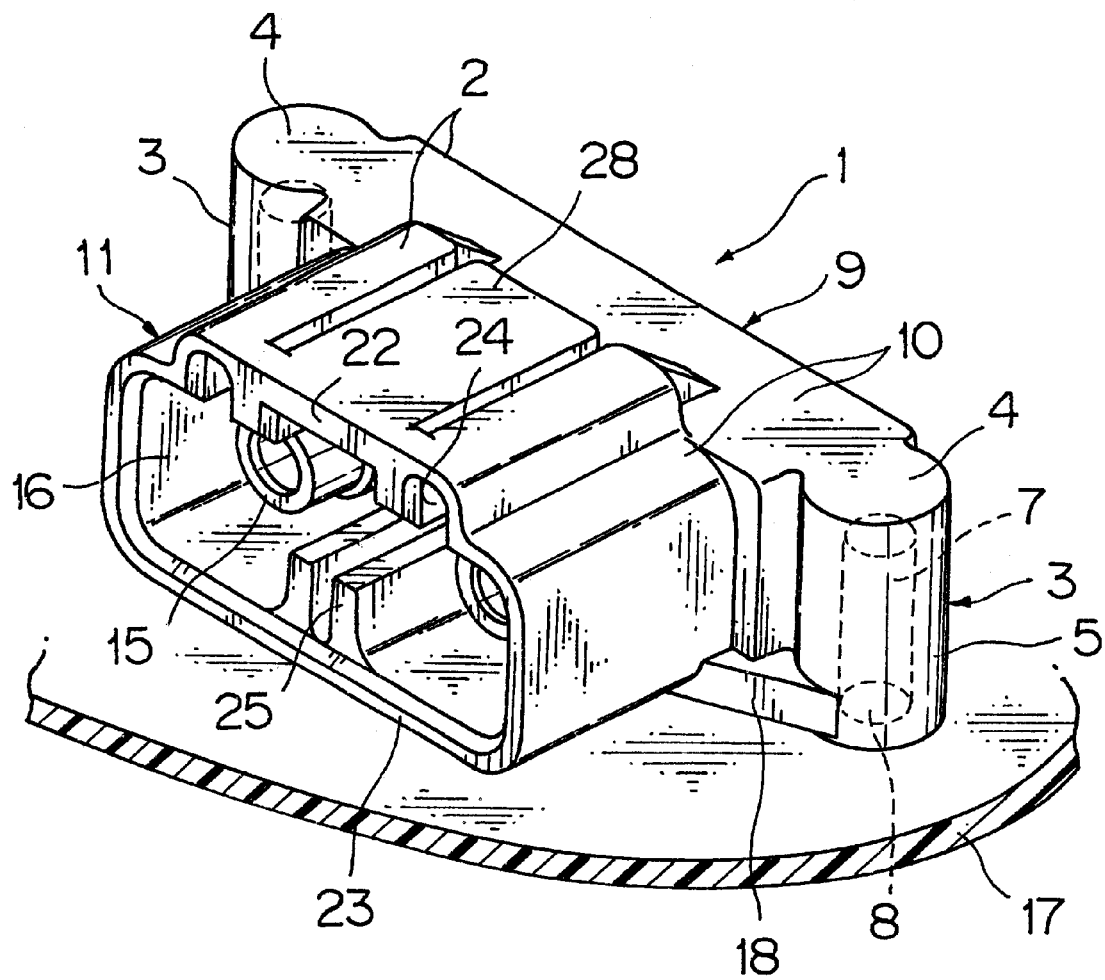
FIG. 1 is a perspective view of a fixing structure for optical connectors according to one embodiment of this invention.
Figure 2:
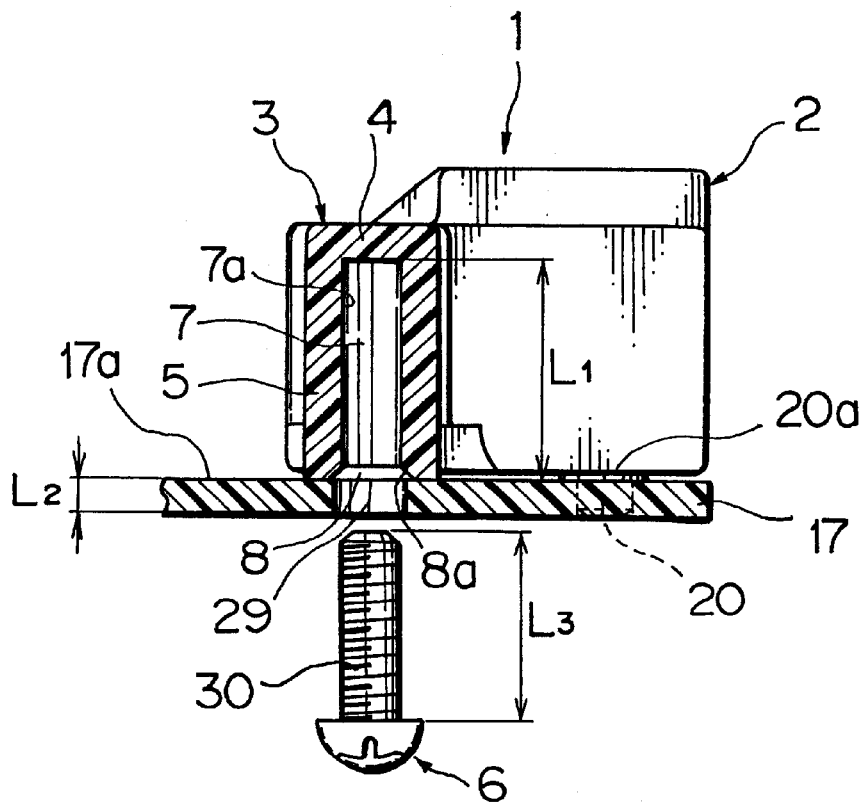
FIG. 2 is a longitudinal section of a receptacle in FIG. 1, about to be fixed to a board with a tapping screw.
Figure 3:
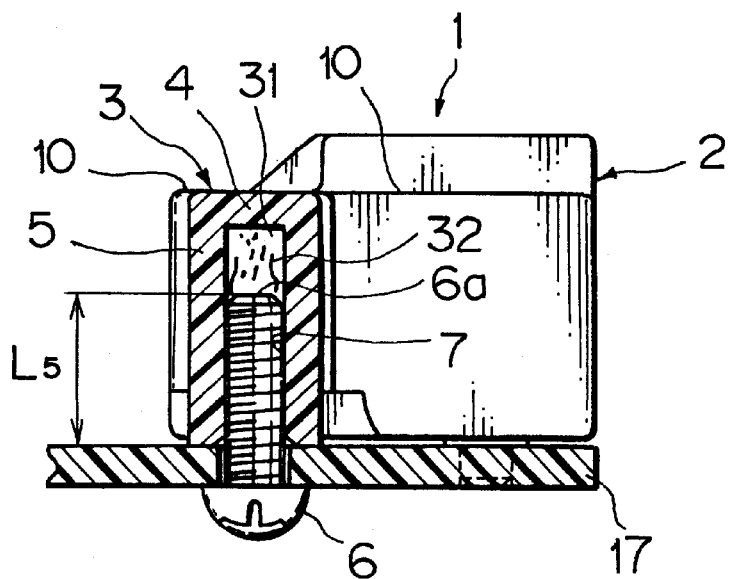
FIG. 3 is a section similar to FIG. 2, showing the receptacle in a fixed condition, with shavings of the receptacle retained inside a fixing portion of the receptacle.
Figure 4:
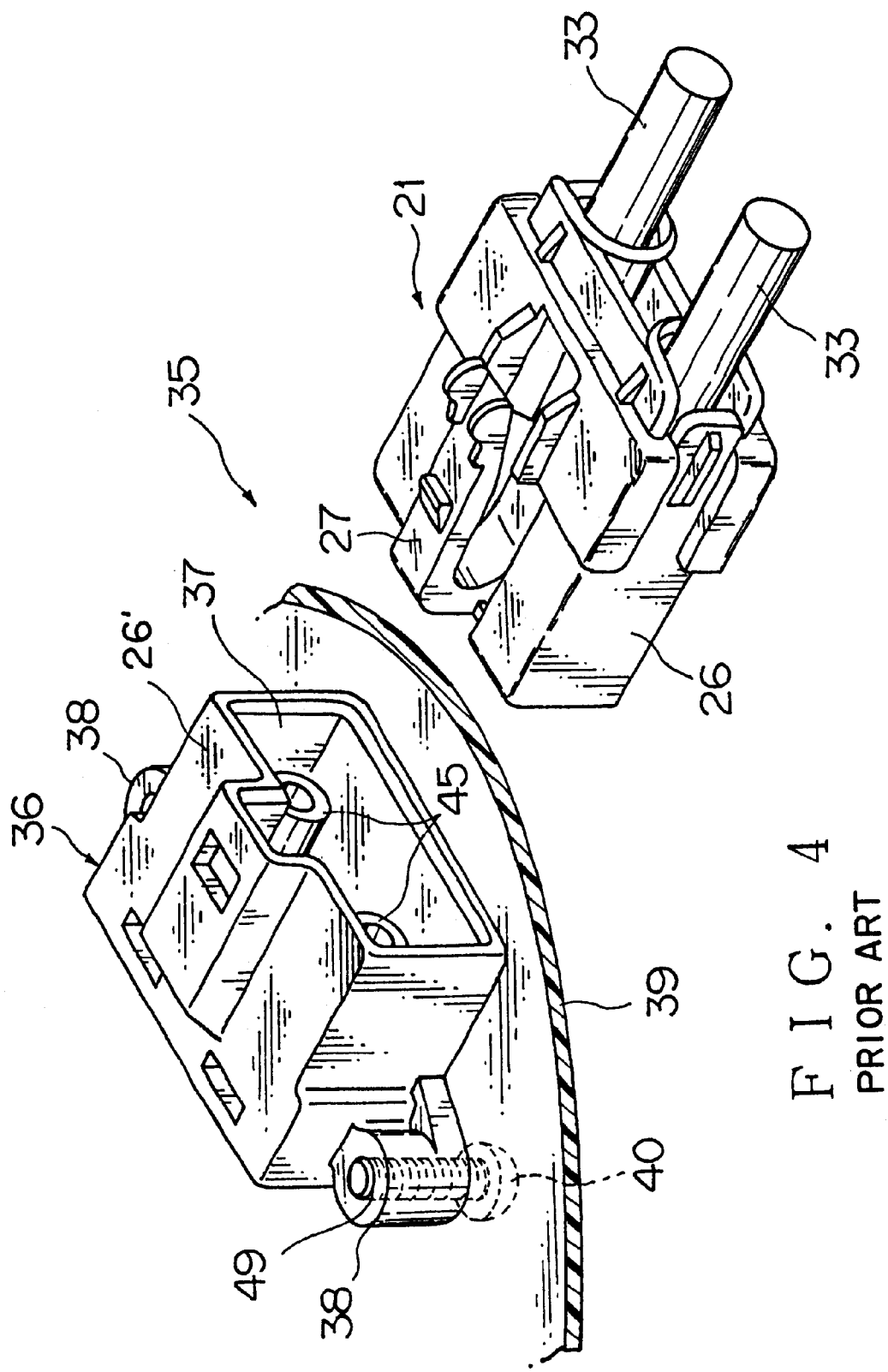
FIG. 4 is a perspective view of a conventional optical connector, with its receptacle and optical plug shown separated.

FIGS. 1 to 3 show one embodiment of a fixing structure for optical connectors according to this invention.

A feature of this structure is that fixing portions 3 at opposite sides of a conductive housing 2 of a receptacle 1 are formed not as mere hollow cylinders, but as cylinders having integral ceiling walls (sealing walls) 4.

Each fixing portion 3 consists of a cylindrical wall 5 and the ceiling wall 4, the cylindrical wall being internally provided with a circular prepared hole 7 without a thread (FIG. 2) for screwing therein of a tapping screw (male screw) 6. The prepared hole 7 is thus defined by a smooth inner peripheral wall 7a. The prepared hole 7 has a lower opening 8 provided with a taper 8a for facilitating the screw in of the tapping screw 6. The ceiling wall 4 is provided at an upper end of the cylindrical wall 5 to be integral with and extend at right angles to the cylindrical wall. As will be apparent from FIG. 2, the thicknesses of the ceiling wall 4 and the cylindrical wall 5 are substantially the same.

Figure 7:
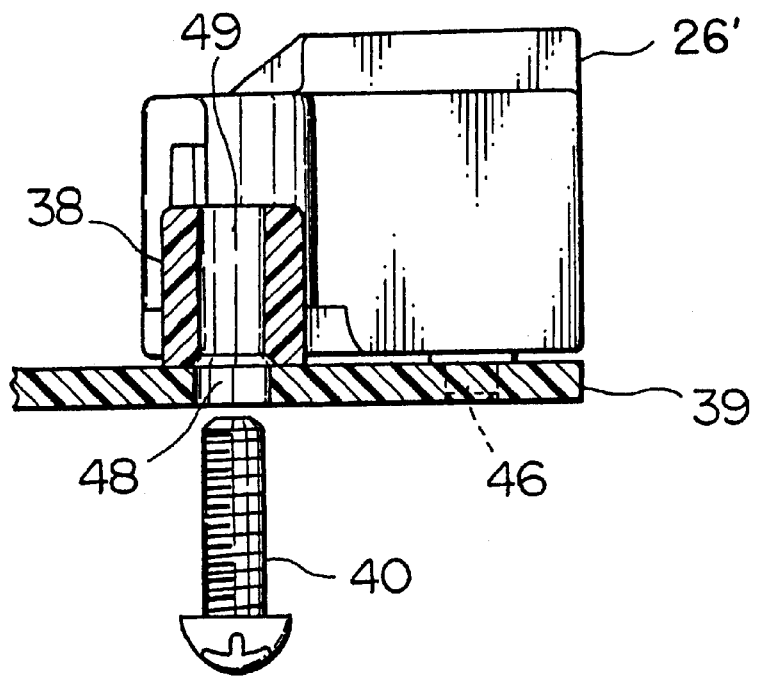
FIG. 7 is a longitudinal section of a conventional fixing structure for optical connectors (receptacles)
Figure 8:
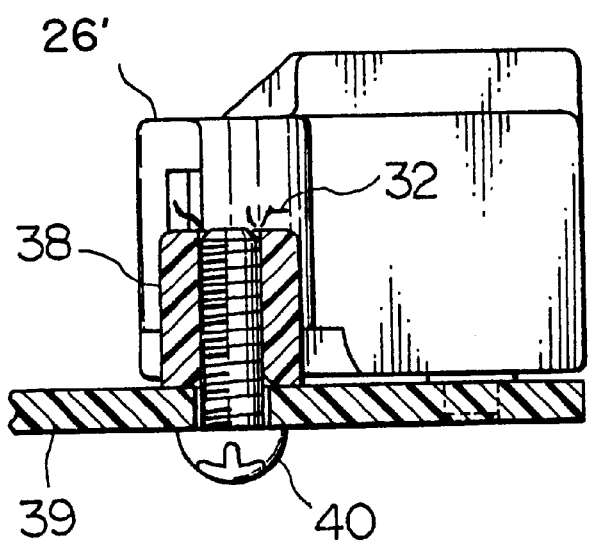
FIG. 8 is a section similar to FIG. 7, showing a drawback to the conventional fixing structure.

The housing 2 is made of conductive synthetic resin containing carbon fibers or the like as in the conventional housing 44 and, as shown in FIG. 1, includes a rearward body portion 9 and a forward hood portion 11 integral with each other. The fixing portions 3, which are integral with the body portion 9, are set greater in height than the conventional fixing portions 38 (FIG. 7) and substantially the same in height as the body portion 9. In other words, the upper surface of the ceiling walls 4 is flush with the upper outer walls 10 of the body portion 9 and of the hood portion 11 at the lateral sides. This arrangement simplifies the shape of the housing 2 and results in the molding die (not shown) simplified in structure and the molding die easily removable after completion of the molding, leading to a reduction in the production cost.

Figure 6:
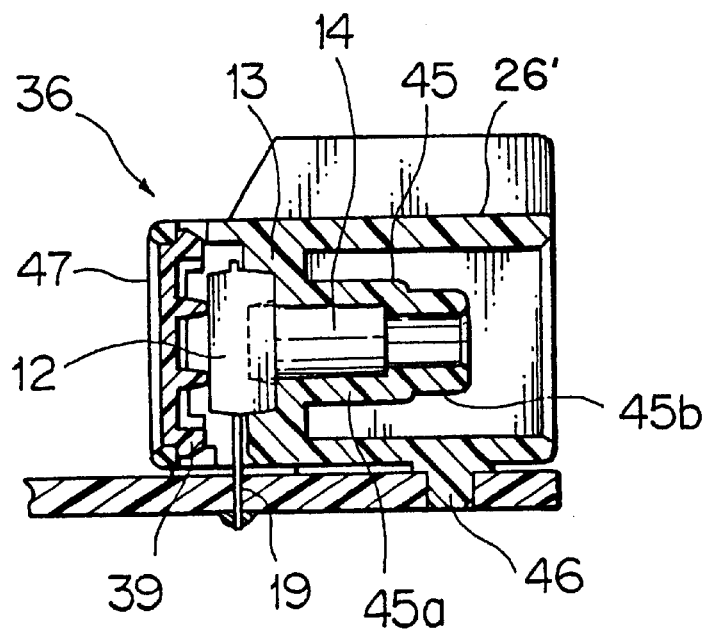
FIG. 6 is a longitudinal section of the receptacle in FIG.

An optical element module (equivalent of the conventional one shown at 12 in FIG. 6) is accommodated in the body portion 9 of the housing 2 to make contact with a sleeve (equivalent of the one at 14 in FIG. 6) inside a receiving cylinder 15 projecting from a partition wall (equivalent of the one at 13 in FIG. 6). The sleeve includes a waveguide. The receiving cylinder 15 is located inside a fitting chamber 16 defined by the hood portion 11 of the housing 2.

The body portion 9 of the housing 2, inclusive of the pair of fixing portions 3 at the opposite sides, has a substantially rectangular shape elongated in a width direction of the housing and is directly fixed to the circuitboard 17. The body portion 9 of the housing 2 has an integral flange 18 at the lower end which extends to the lower end of the fixing portion 3.

A lead terminal (cf. 19 in FIG. 6) of the optical element module (cf. 12 in FIG. 6) extends to the underside of the body portion 9 of the housing 2 to connect to the circuit board 17. The housing 2, as shown in FIG. 2, connects at least at the fixing portions 3 and a positioning pin 20 to a ground circuit (not shown) disposed on the surface of the circuit board 17.

Figure 5:
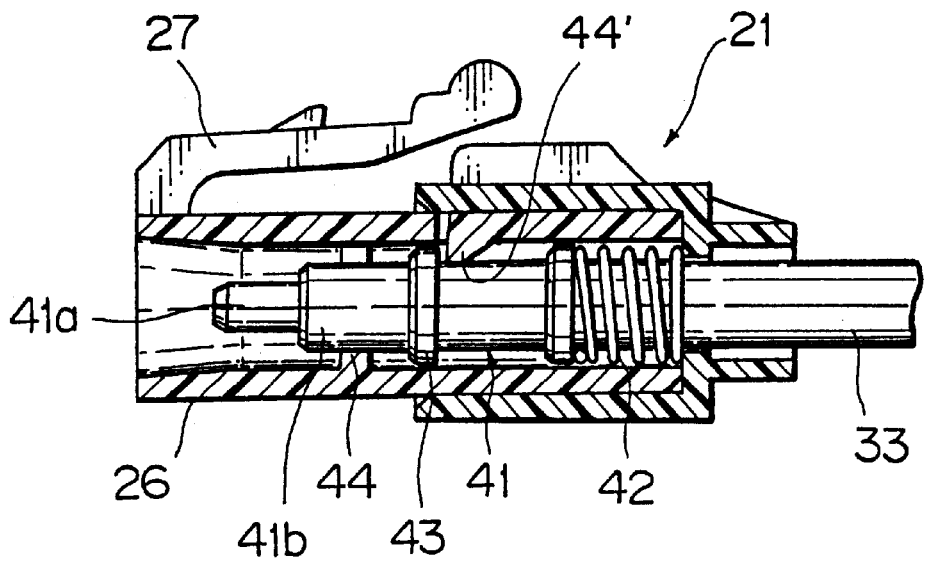
FIG. 5 is a longitudinal section of the optical plug in FIG. 4.

As shown in FIG. 1, the hood portion 11 of the housing 2, which is substantially rectangular in shape, projects in a connector-fitting direction from the body portion 9 to internally define the fitting chamber 16 for a mating optical plug (equivalent of the one at 21 in FIG. 5). On the upper and lower walls 22, 23 inside the fitting chamber 16, there are provided guide grooves 24 and guide projections 25 for the optical plug housing (equivalent of the one at 26 in FIG. 5) which extend in the connector-fitting direction. The upper wall 22 is formed with an engagement portion 28 corresponding to a locking arm (equivalent of the one at 27 in FIG. 5) provided on the optical plug.

As shown in FIG. 2, the total sum of the length $L_1$ of the prepared hole 7 inside the fixing portion 3 and the length $L_2$ of the insertion hole 29 of the circuit board 17 (the wall thickness of the circuit board 17) is set sufficiently larger than the length $L_3$ of the male thread 30 of the tapping screw 6. In other words, the length $L_1$ of the prepared hole 7 is set large as compared with the projection length $L_5$ (FIG. 3) of the tapping screw 6 from the surface 17a of the circuit board 17. This arrangement, as shown in FIG. 3, enables an enclosed saving receiver 31 to be formed inside the fixing portion 3 when the tapping screw 6 is threaded into the prepared hole 7. The saving receiver 31 is provided as a columnar space, between the tip end 6a of the tapping screw 6 and the ceiling wall 4 of the fixing portion 3.

In FIG. 2, the insertion hole 29 of the circuit board 17 has a diameter equal to or slightly larger than the outer diameter of the tapping screw 6, and the diameter of the prepared hole 7 of the fixing portion 3 is set smaller than the outer diameter of the tapping screw 6.

As shown in FIG. 3, as the tapping screw 6 is threaded into the prepared hole 7 of the fixing portion 3, the conductive shavings 32 are pushed upwardly by the tip end 6a of the tapping screw 6 and are retained in the shaving receiver 31.

Because the shaving receiver 31 is completely enclosed with the cylindrical wall 5, ceiling wall 4 and tip end 6a of the tapping screw 6, it is excluded that the shavings 32 come out of and fall from the fixing portion 3 to cause a short circuit or stain on the circuit board 17.

Because the tip end 6a of the tapping screw 6 is protected in the fixing portion 3 including the ceiling wall 4 and cut off from the outside, the tapping screw 6 is kept from contact with the outside, and thus a short circuit is prevented if the tapping screw 6 is connected, for example, to a ground circuit wired on the circuit body 17. Further, the fixing portion 3 serves to improve the stiffness of the receptacle 1 at the fixing portion 3, thereby to better adapt the receptacle 1 for fixation to the circuit board 17.

In the structure as mentioned above, the conductive housing 2 employed serves as a shield, and the noise-causing electrical interference from the outside and inside of the receptacle 1 is grounded to the circuit board 17, thereby to enable signals to be accurately transmitted through the optical fibers (cf. 33 in FIG. 1).

While in the above example, the circuit board 17 is shown in a horizontal position, it may be used in a vertical position, with the fixing portion 3 laid horizontal, or inclined or upside down position. Even in this case, the ceiling wall 4 keeps the shavings 32 inside the shaving receiver 31 and from falling therefrom. As a result, ambient devices and electric components (not shown) are also kept free from the shavings 32, thereby preventing an adverse effect which would otherwise be caused to them.

A common bolt or small screw (not shown) may be used in place of the tapping screw 6. In such a case, however, the prepared hole 7 of the fixing portion 3 needs be provided with a female thread, which is rather difficult from a technical point of view and may cause an increase in the cost. The use of the tapping screw 6 will thus be the best. In any event, fine shavings are produced even in the case of fixation through the threading engagement of common male and female screws, and such shavings are also securely retained inside the fixing portion 3 including the ceiling wall 4.

Having now fully described the invention, it will be apparent to one of ordinary skill in the art that many changes and modifications can be made thereto without departing from the spirit and scope of the invention as set forth herein.

What is claimed is:

1. A fixing structure for optical connectors, comprising:
    a circuit board;
    a receptacle having a conductive housing shieldingly connected to said circuit board, said housing having an integral fixing portion with a prepared hole formed therein; and
    a screw passed through said circuit board and screwed in said prepared hole of said fixing portion to fix said housing to said circuit board,
    wherein said fixing portion has a cylindrical wall and a sealing wall which has a thickness substantially equal to a thickness of said cylindrical wall and closes said prepared hole at a distal end thereof and an enclosed cylindrical shaving receiver formed with two elements of said fixing portion and said screw in said prepared hole, between said sealing wall and said screw, for retaining shavings produced when said screw is screwed in said prepared hole.

2. The fixing structure according to claim 1, wherein said screw comprises a tapping screw, and said prepared hole comprises a hole without a thread.

3. The fixing structure according to claim 1, wherein said screw comprises a bolt, and said prepared hole comprises a hole with a female thread.

4. The fixing structure according to claim 1, wherein a length of said prepared hole is set greater than a projection length of said screw from said circuit board.

5. The fixing structure according to claim 1, wherein said sealing wall of said fixing portion is flush with an outer wall of said housing.

* * * * *